(No Model.) 3 Sheets—Sheet 1.
J. W. KENEVEL.
MEANS FOR MANUFACTURING CARBIDS.
No. 588,866. Patented Aug. 24, 1897.
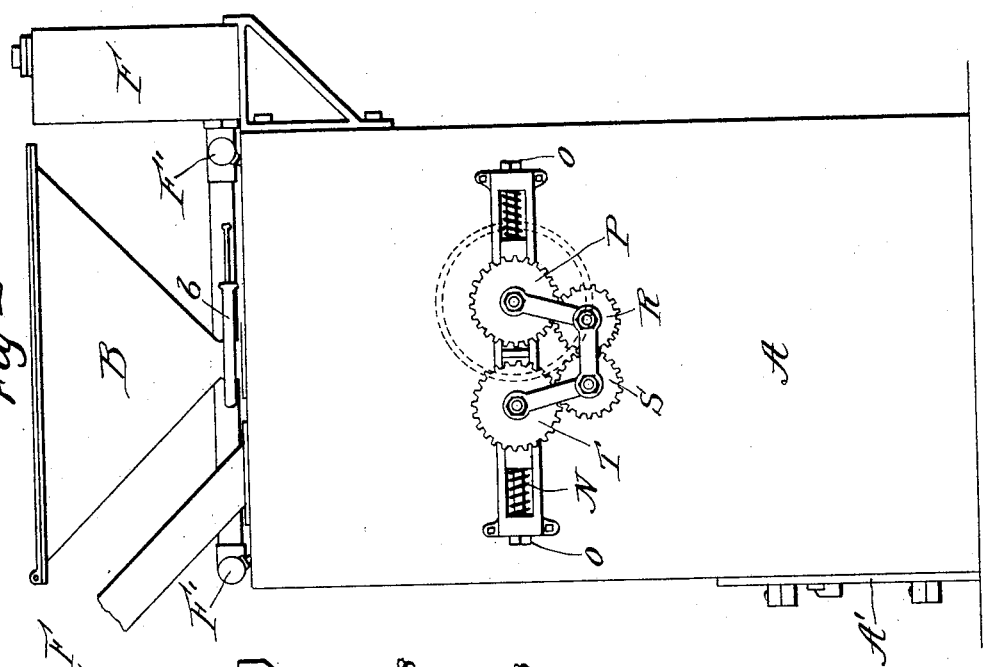
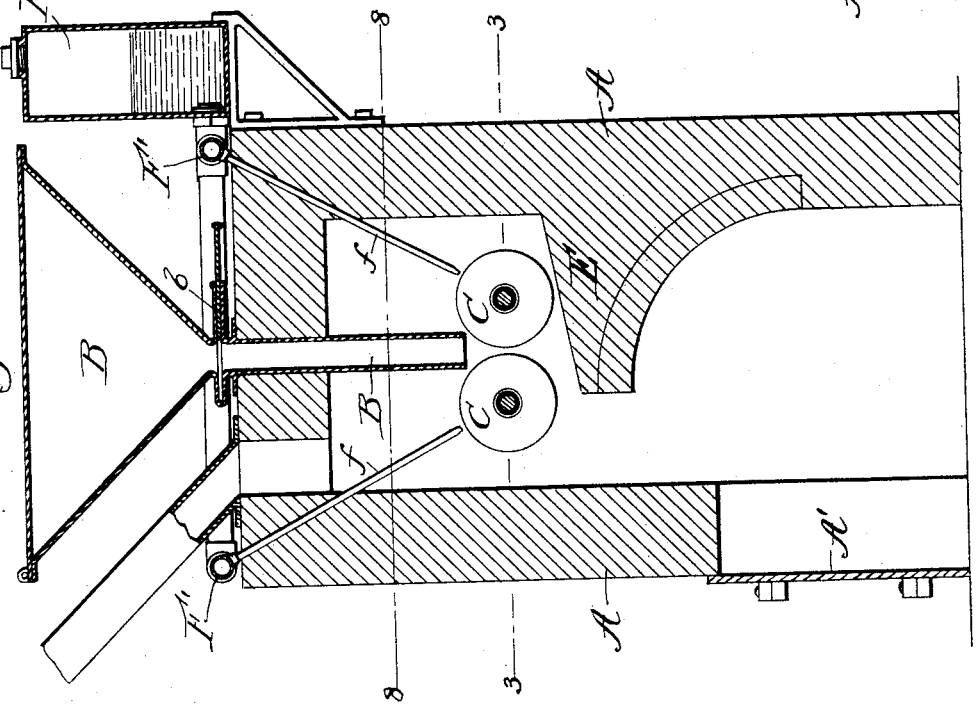

(No Model.) 3 Sheets—Sheet 2.
J. W. KENEVEL.
MEANS FOR MANUFACTURING CARBIDS.
No. 588,866. Patented Aug. 24, 1897.
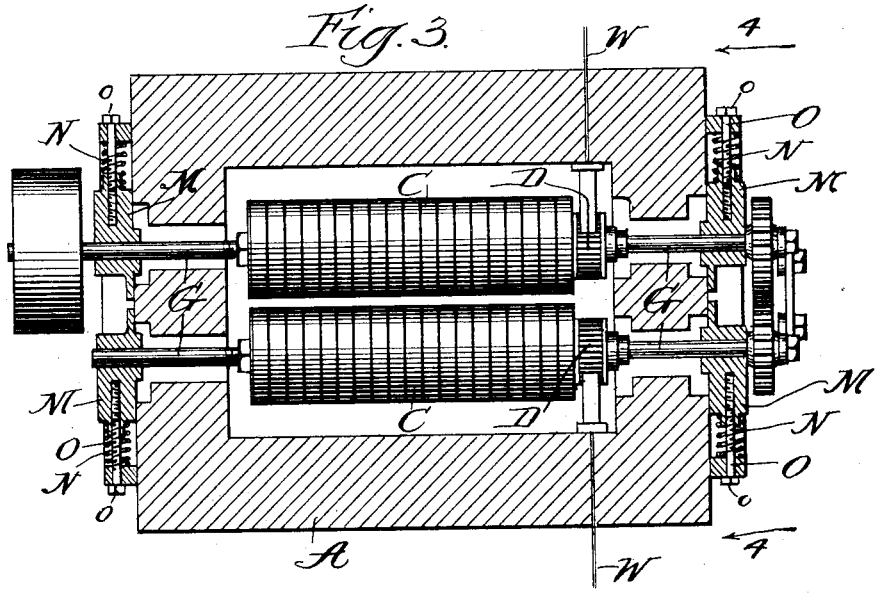
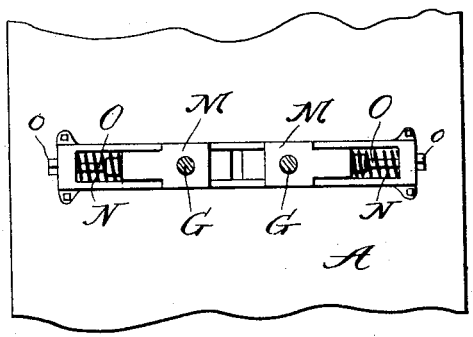
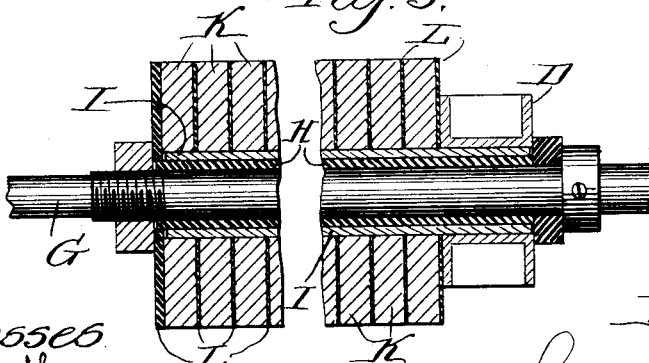

(No Model.) 3 Sheets—Sheet 3.
J. W. KENEVEL.
MEANS FOR MANUFACTURING CARBIDS.
No. 588,866. Patented Aug. 24, 1897.

Witnesses
Wm. F. Henning
L. A. Gardiner

Inventor
Jeannot W. Kenevel
By Hill & Hill
Attys.

UNITED STATES PATENT OFFICE.

JEANNOTT W. KENEVEL, OF CHICAGO, ILLINOIS, ASSIGNOR OF ONE-HALF TO JOSIAH H. MEAD, OF BROOKLYN, NEW YORK.

MEANS FOR MANUFACTURING CARBIDS.

SPECIFICATION forming part of Letters Patent No. 588,866, dated August 24, 1897.

Application filed February 1, 1897. Serial No. 621,581. (No model.)

*To all whom it may concern:*

Be it known that I, JEANNOTT W. KENEVEL, a citizen of the United States of America, residing at Chicago, county of Cook, and State of Illinois, have invented certain new and useful Improvements in Means for Manufacturing Carbids, of which the following is a description.

Figure 6:
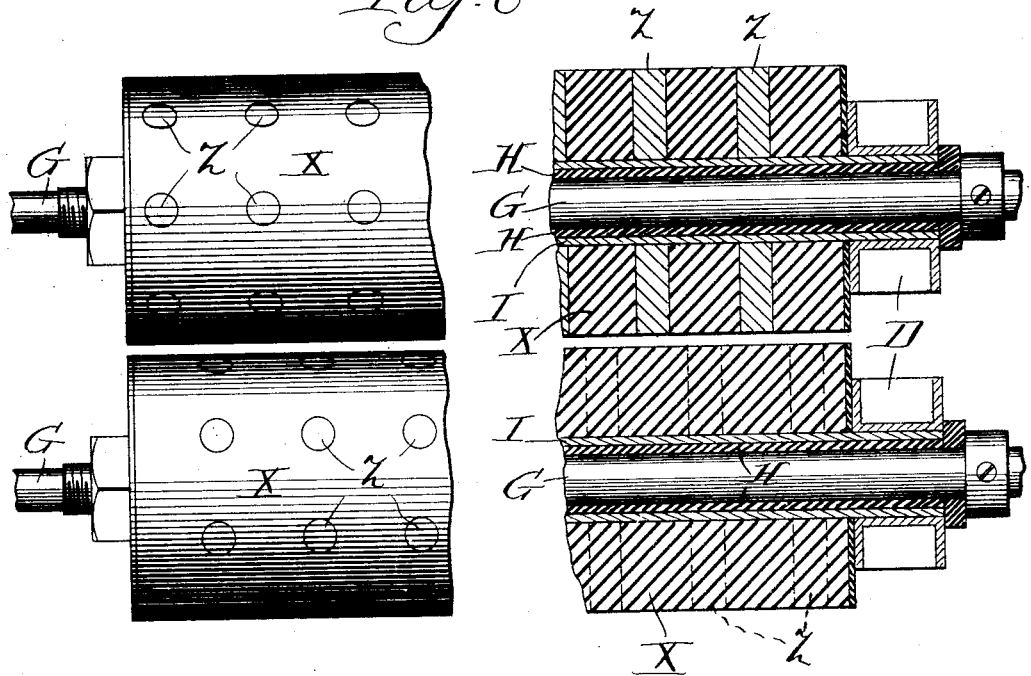
Figure 7:
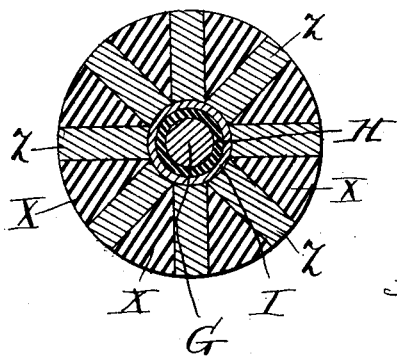
Figure 8:

Referring to the accompanying drawings, wherein like reference-letters indicate like or corresponding parts, Figure 1 is a vertical section of my improved apparatus. Fig. 2 is a side elevation showing the driving mechanism. Fig. 3 is a horizontal section in line 3 3 of Fig. 1. Fig. 4 is a partial end view in line 4 4 of Fig. 3 in partial section. Fig. 5 is a detail view of the preferred electrode-roll. Fig. 6 is a view, partially in section, of a modified form of roll. Fig. 7 is a transverse section of the same, and Fig. 8 is a horizontal section in line 8 8 of Fig. 1.

This invention relates to an improved means for the manufacture of carbids.

To this end it consists, broadly, in passing the prepared material, consisting of carbon and a base—such, for example, as lime—between movable or rotatable electrodes which are suitably connected to a source of electricity to secure the necessarily high temperature.

It also consists in the peculiarly-constructed electrodes herein described.

It also consists in such other novel construction and combination of parts, as are shown and described, and are particularly pointed out in the claims.

Referring now to the drawings, A represents a wall or casing inclosing a furnace, with a funnel or hopper B extending upward therefrom. A gate *b* regulates the feeding of the material through the funnel, the lower end of which terminates above the electrode-rolls C C, which are arranged in a substantially horizontal plane and are caused to rotate, preferably toward each other, by any preferred form of connecting mechanism, Fig. 2. The wires W W conduct the current to the electrodes C C by suitable connections, as by the commutators D D, Fig. 3.

The electrode-rolls may be of any preferred construction which properly connected will accomplish the object sought.

The mode of operation as thus far described is as follows: Taking the necessary proportions of the desired materials—for example, substantially two parts of lime to one of carbon or coke—I pulverize and mix them thoroughly. I then place or feed the material into the hopper B, from which it is allowed to escape at the desired rate between the rolls C, which are rotated at a speed suitable to accomplish the best results. In passing between the electrodes the material becomes heated to the extent necessary to transform it into a carbid and falls to the bottom of the furnace as such, from whence it may be removed by way of the door A'.

In practice I prefer to construct one or more baffle-plates E below the rolls, which are preferably of non-conducting material and serve to retard the too rapid passage of the carbid and also permit it to cool slightly in its fall. I have also found it advisable to use some means to keep the electrodes clean and prevent any adherence of the carbid to them. For this purpose I prefer to construct a tank or reservoir F near the furnace and above the rolls, and by pipes F' F' conduct a fluid suitable for the purpose along above each roll, from whence it may be conducted at regular intervals to the surface of the rolls by gravity through the series of small pipes *f*. The fluid I prefer to use for this purpose is coal-oil or kerosene, which I find is satisfactory for the purpose and has no deleterious effect on the product. This action, as I understand it, is mechanical, the oil filling the pores of the surface of the rollers and forming an extremely thin film over the same, preventing the falling and melting material from coming into actual contact with the surface of the rollers, thus preventing the adhesion of the melted material to them. A familiar example of such action is to be found in the greasing of a griddle to prevent the adhesion of batter to it.

While it is obvious that the rolls may be on their exterior of a single electrode sleeve or barrel of carbon or other suitable material, the preferred construction is shown at Fig. 5, in which the shaft G is first provided with a sleeve H, of non-conducting material—as, for example, glass—which is in turn covered by a sleeve I, which is of good conducting material—as, for example, copper. Upon the latter are placed alternately disks K, of material suitable for electrodes—for example, carbon—and non-conducting disks L, of glass, mica, or other suitable material. The wires W W conduct the current to the rolls by means of suitable commutators D D or other equivalent means and the conducting-sleeve I. Each disk K is thus an electrode, and the roll is thus in effect a multiple electrode of simple form.

In practice I prefer to support the rolls in such a manner that they may be adjusted relatively to each other at will to secure the best results. Any preferred means may be employed for this purpose, that shown in Fig. 4 proving very satisfactory. In this form the ends of the shafts G are supported in the movable blocks M. The springs N hold them resiliently to their inner limit, while the bolts O and nuts o regulate the distance desired for them to approach each other. The train of gears P R S T permits such adjustment.

As a modification of the multiple-electrode roll just described I may use the form shown in Figs. 6 and 7, in which an outer cylinder X of non-conducting material—as, for example, fire-brick clay—encircles the conducting-sleeve I, while sticks or pencils Z, of carbon or other suitable material, radially extend from the conducting-sleeve I to the exterior.

It is obvious that after pointing out my invention various immaterial modifications may be suggested without departing from the spirit of my invention. Hence I do not desire to be understood as limiting myself to the precise form or construction herein shown.

Having thus described my invention, what I claim as new, and desire to secure by Letters Patent, is—

1. Means for manufacturing carbids, consisting of a suitable casing within which are positioned a pair of rotatable electrodes arranged in a substantially horizontal plane, mechanism for rotating the same, and means for connecting the electrodes with a source of electricity; in combination with means for conducting the prepared material between the electrodes, substantially as described.

2. Means for manufacturing carbids, consisting of a suitable casing within which are positioned a pair of rotatable electrodes arranged in a substantially horizontal plane, mechanism for rotating the same, and means for conducting the electrodes to a source of electricity; in combination with means for conducting the material between the electrodes and means for preventing the adherence of the material to the same, substantially as set forth.

3. Means for manufacturing carbids, consisting of a suitable casing within which are positioned a pair of rotatable electrodes arranged in a substantially horizontal plane, mechanism for rotating the electrodes, and means for connecting the electrodes with a source of electricity; in combination with a receptacle arranged above the electrodes, adapted to conduct the material between them, and means for controlling the discharge from the receptacle, substantially as, and for the purpose set forth.

4. Means for manufacturing carbids, consisting of a suitable casing within which are positioned a pair of rotatable electrodes arranged in a substantially horizontal plane, means for adjusting the electrodes relatively to each other, mechanism for rotating the electrodes, and means for connecting them with a source of electricity; in combination with a receptacle arranged above the electrodes adapted to conduct the material between them, substantially as and for the purpose set forth.

5. Means for the manufacture of carbids, consisting of a suitable casing within which are positioned a pair of rotatable electrodes arranged in a substantially horizontal plane, mechanism for rotating the electrodes, means for connecting them with a source of electricity, and means for conducting the material to be treated between them; in combination with a reservoir and means for conducting the contained material in the reservoir to the electrodes, substantially as and for the purpose set forth.

6. Means for the manufacture of carbids, consisting of a suitable casing within which are positioned a pair of rotatable electrodes arranged in a substantially horizontal plane, mechanism for rotating the electrodes, means for connecting them to a source of electricity, and means for conducting the material to be treated between them; in combination with a reservoir and conducting-pipes extending from the reservoir to the electrodes, whereby the material is conducted to the surface of the electrodes at a plurality of points, substantially as and for the purpose set forth.

7. Means for manufacturing carbids, consisting of a suitable casing within which are positioned a pair of rotatable electrodes arranged in a substantially horizontal plane, mechanism for rotating the same, means for connecting the electrodes to a source of electricity, and means for conducting the prepared material between them; in combination with one or more baffle-plates arranged below the electrodes upon which the treated material will fall, substantially as and for the purpose set forth.

8. Means for manufacturing carbids, consisting of a suitable casing within which are positioned a pair of rotatable multiple electrodes arranged in a substantially horizontal plane, mechanism for rotating the same, and means for connecting the electrodes with a source of electricity; in combination with means for conducting the prepared material between the electrodes; substantially as described.

9. A multiple, rotatable electrode, consisting essentially of the following elements in combination: a suitable supporting-shaft provided with a sleeve of non-conducting material, an outer sleeve of conducting material, and a plurality of conductors in electrical contact with the outer sleeve, but otherwise insulated from one another, substantially as and for the purpose set forth.

10. A multiple rotatable electrode, consisting essentially of the following elements in combination: a suitable supporting-shaft surrounded by a sleeve of non-conducting material, a second sleeve of conducting material surrounding the first, disks of conducting and non-conducting material arranged alternately upon the outer sleeve in connection therewith, and means for connecting the whole with a source of electricity; substantially as and for the purpose set forth.

JEANNOTT W. KENEVEL.

Witnesses:
JOHN W. HILL,
L. A. GARDINER.